(12) United States Patent  
Miles et al.

(10) Patent No.: US 7,744,039 B2  
(45) Date of Patent: Jun. 29, 2010

(54) SYSTEMS AND METHODS FOR CONTROLLING FLOWS WITH ELECTRICAL PULSES

(75) Inventors: Richard B. Miles, Princeton, NJ (US); Sergey O. Macheret, Lancaster, CA (US); Mikhail Shneider, Princeton, NJ (US); Alexandre Likhanskii, Princeton, NJ (US); Joseph Steven Silkey, Florissant, MO (US)

(73) Assignees: The Boeing Company, Chicago, IL (US); Princeton University, Princeton, NJ (US)

( * ) Notice: Subject to any disclaimer, the term of this patent is extended or adjusted under 35 U.S.C. 154(b) by 466 days.

(21) Appl. No.: 11/649,706

(22) Filed: Jan. 3, 2007

(65) Prior Publication Data

US 2008/0023589 A1     Jan. 31, 2008

Related U.S. Application Data

(60) Provisional application No. 60/755,912, filed on Jan. 3, 2006.

(51) Int. Cl.  
    *B64C 21/00*     (2006.01)

(52) U.S. Cl. .................................... 244/205

(58) Field of Classification Search ........... 244/205, 244/134 D, 175, 198, 200, 130, 171.7  
See application file for complete search history.

(56) References Cited

U.S. PATENT DOCUMENTS

| | | | |
|---|---|---|---|
| 4,749,151 A | 6/1988 | Ball et al. | |
| 5,828,684 A | 10/1998 | Van de Walle | |
| 5,917,286 A * | 6/1999 | Scholl et al. | ........... 315/111.21 |
| 5,920,923 A | 7/1999 | Jillette | |
| 6,276,636 B1 * | 8/2001 | Krastel | ........................ 244/130 |
| 6,518,692 B2 | 2/2003 | Schoenbach et al. | |
| 6,528,947 B1 | 3/2003 | Chen et al. | |
| 2004/0195462 A1 | 10/2004 | Malmuth et al. | |

(Continued)

FOREIGN PATENT DOCUMENTS

EP     1953382     8/2008

(Continued)

OTHER PUBLICATIONS

U.S. Appl. No. 12/166,199, filed Jul. 1, 2008, Schwimley et al.

(Continued)

*Primary Examiner*—Timothy D Collins  
*Assistant Examiner*—Michael Kreiner  
(74) *Attorney, Agent, or Firm*—Perkins Coie LLP

(57) ABSTRACT

Systems and methods for controlling flow with electrical pulses are disclosed. An aircraft system in accordance with one embodiment includes an aerodynamic body having a flow surface exposed to an adjacent air stream, and a flow control assembly that includes a first electrode positioned at least proximate to the flow surface and a second electrode positioned proximate to and spaced apart from the first electrode. A dielectric material can be positioned between the first and second electrodes, and a controller can be coupled to at least one of the electrodes, with the controller programmed with instructions to direct air-ionizing pulses to the electrode, and provide a generally steady-state signal to the electrode during intervals between the pulses.

30 Claims, 7 Drawing Sheets

U.S. PATENT DOCUMENTS

2008/0096045 A1* 4/2008 Fairbourn et al. ............ 428/641
2008/0290218 A1 11/2008 Schwimley et al.

FOREIGN PATENT DOCUMENTS

| RU | 2005133953 | 11/2005 |
|---|---|---|
| WO | WO-9410032 | 5/1994 |
| WO | WO-2007054774 | 5/2007 |

OTHER PUBLICATIONS

U.S. Appl. No. 12/339,674, filed Dec. 19, 2008, Silkey et al.
"Atmospheric Absorption in UV Band," http://www.globalwarmingart.com/wiki/Image:Atmospheric_Transmission_png, Jun. 2007, 4 pages.
"Deep UV Lasers 224 and 248 nm," http://www.photonsystems.com/pdfs/duv-lasersource-rev2.pdf, 2 pages.
"FQCW 266 Diode Pumped Continuous Wave Solid State Laser " www.crylas.de, 2008, 2 pages.
A. A. Maslov, B. Yu. Zanin, A. A. Sideorenko, B.V Postnikov, V. P. Fomichev, A.D. Budovsky and N. Malmuth, "Two-Channel Spark Discharge for Flow Control on a Body of Revolution," AIAA Paper No. 2005-040, Reno NV, Jan. 10-13, 2005.
Chen J., Park, S., Fan, Z., Eden, J. G., Liu, C., "Development and Characterization of Micromachined Hollow Cathode Plasma Display Devices," Journal of Microelectromechanical Systems, vol. 11, No. 5, Oct. 2002, pp. 536-543.
D.V. Roupassov,I.N. Zavyalov, A.Yu. Starikov, "Boundary Layer Separation Plasma Control Using Low-Temperature Non-Equilibrium Plasma of Gas Discharge," 44-rd AIAA Aerospace Sciences Meeting and Exhibit, Reno, Nevada, USA, paper AIAA-2006-373, 2006.
J. Reece Roth and Xin Dai, "Optimization of the Aerodynamic Plasma Actuator as an Electrohydrodynamic (EHD) Electrical Device," AIAA Paper No. 2006-1203, Reno NV, Jan. 9-12, 2006.
Oh, Hye-Keun, "Process Study of a 200 nm Laser Pattern Generator," Journal of the Korean Physical Society, vol. 41 No. 6, Dec. 2002, pp. 839-842.
Sidorenko, A.A., Boris, Y.Z., Boris, V.P., Budovsky, A.D., "Pulsed Discharge Actuators for Rectangular Wing Separation Control," American Institute of Aeronautics and Astronautics, 2007, pp. 1-11.
Zavyalov I.N., Roupassov D.V., Starikovsii A. Yu., Saddoughi S.G., "Boundary Layer Control" by Gas Discharge Plasma. EUCASS, Moscow, 2005.
"IV.30—Drift Step Recovery Diodes?" http://www.avtechpulse.com/faq/html/IV.30/ accessed Mar. 5, 2009, 1 page.
"MHE- Pulse Systems Group," http:/www.moose-hill.com/pulse.htm, accessed Mar. 5, 2009, 4 pages.
U.S. Appl. No. 11/403,252, Silkey et al.
Anderson, R., "Barrier Discharge Plasma Actuators for Dry and Humid Atmospheres", Paper Aiaa-2006-0369, 44th AIAA Aerospace Sciences Meeting and Exhibit, Reno, NV, Jan. 9-12, 2006.
Boeuf, J.P. et al., "Electrohydrodynaic force and aerodynamic flow acceleration in surface dielectric barrier discharge," Journal of Applied Physics, vol. 97, 2005, 103307-1-103307-10.
Corke, T., "Plasma Flow Control Optimized Airfoil", Paper AIAA-2006-1208, 44th AIAA Aerospace Sciences Meeting and Exhibit, Reno, NV, Jan. 9-12, 2006.

Corke, T.C. et al., "Application of Weakly-Ionized Plasmas as Wing Flow-Control Devices," Paper AIAA 2002-350, 40th AIAA Aerospace Sciences Meeting & Exhibit, Reno, NV, Jan. 14-17, 2002.
Enloe, C.L. et al., "Mechanisms ad Responses of a Single Dielectric Barrier Plasma Actuator: Plasma Morphology", AIAA Journal, vol. 42, o. 3, 2004, pp. 589-594.
Enloe, C.L. et al., "Mechanisms and Responses of a Single Dielectric Barrier Plasma Actuator: Geometric Effects", AIAA Journal, vol. 42, No. 3, 2004, pp. 595-604.
Gaitonde, D., "A Coupled Approach for 3-D RF-Based Flow Control Simulations", Paper AIAA-2006-1205, 44th AIAA Aerospace Sciences Meeting and Exhibit, Reno, NV, Jan 9-12, 2006.
Likhanskii, A. et al., "Modeling of Interaction Between Weakly Ionized ear-Surface Plasmas and Gas Flow", Paper AIAA-206-1204, 44th AIAA Aerospace Sciences Meeting and Exhibit, Reno, NV, Jan. 9-12, 2006.
Likhanskii, A.V., et al., Optimization of Dielectric Barrier Discharge Plasma Actuators Driven by Repetitive Nanosecond Pulses, 45th AIAA Aerospace Sciences Meeting and Exhibit, Reno, Nevada, Jan. 8-11, 2007, pp. 13.
Loeb, L.B., "Ionizing waves of potential gradients", Science 148, p. 1417, 1965.
Opaits, D.F. et al., "Plasma Control of Boundary Layer Using Low-Temperature Non-Equilibrium Plasma of Gas Discharge," Paper AIAA 2005-1180, 43rd AIAA Aerospace Sciences Meeting and Exhibit, Reno, NV, Jan. 10-13, 2005.
Orlov, D. M., et al., "Numerical Simulation of Aerodynamic Plasma Actuator Effects," Paper AIAA 2005-1083, 43rd AIAA Aerospace Sciences Meeting and Exhibit, Reno, NV, Jan. 10-13, 2005.
Post, M. et al., "Flow Control with Single Dielectric Barrier Plasma Actuator," Paper AIAA 2005-4630, 35th AIAA Fluid Dynamics Conference and Exhibit, Toronto, Ontario, Jun. 6-9, 2005.
Post, M.L. et al., "Separation Control on High Angle or Attach Airfoil Using Plasma Actuators," AIAA Journal, vol. 42, o. 11, 2004, pp. 2177-2184.
Roth, J.R., "Optimization of Aerodynamic Plasma Actuator as an Electrohydrodynamic (EHD) Electrical Device", Paper AIAA-2006-1203, 44th AIAA Aerospace Sciences Meeting and Exhibit, Reno, NV, Jan. 9-12, 2006.
Roy, S. et al., "Modeling surface discharge effects of atmospheric RF on gas flow control," Paper AIAA 2005-160, 43rd AIAA Aerospace Sciences Meeting and Exhibit, Reno, NV, Jan. 10-13, 2005.
Roy, S., "Flow actuation using radio frequency in partially ionized collisional plasmas," Applied Physics Letters, vol. 86, 2005, pp. 101502-1-101502-3.
Singh, K.P. et al., "Simulation of an asymmetric single dielectric barrier plasma actuator," Journal of Applied Physics, vol. 98, 2005, 083303-1-083303-7.
Corke, T.C., and Post, M.L., "Overview of Plasma Flow Control: Concepts, Optimization, and Applications," AIAA Paper No. 2005-563, Reno NV, Jan. 10-13, 2005.
Roth, J.R., Sherman D. M. and Wilkinson S. P.: "Boundary Layer Flow Control with a One Atmosphere Uniform Flow Discharge Surface Plasma". AIAA Paper 98-0328, Proc of the 36th AIAA Aerospace Sciences Meeting & Exhibit Reno, NV, Jan. 12-15, 1998.
Wu, J.-Z., Lu, X.-Y., Denny, A.G., Fan, M., and Wu, J.-M, "Post Stall Flow Control on an Airfoil by Local Unsteady Forcing," J. Fluid Mech., 371, 21-58, 1998.

* cited by examiner

SYSTEMS AND METHODS FOR CONTROLLING FLOWS WITH ELECTRICAL PULSES

CROSS-REFERENCE TO RELATED APPLICATION

The present application claims priority to U.S. Provisional Application 60/755,912, (Express Mail No. EV623709995US), titled "Method of Generating and Controlling Gas Flows by Weakly Ionizing the Gas and Electrostatically Charging a Dielectric Surface," filed Jan. 3, 2006, and incorporated herein in its entirety by reference.

TECHNICAL FIELD

The present disclosure is directed generally to systems and methods for controlling flows with electrical pulses, for example, via dielectric barrier discharge generators or plasma actuators.

BACKGROUND

During flight, a boundary layer of air builds up on the exposed surfaces of an aircraft. The boundary layer is a thin film of low velocity, low dynamic pressure air located near a solid boundary and resulting from the air being at rest along the solid boundary. The boundary layer which forms on surfaces located upstream of an aircraft engine can become ingested by the engine and decrease the recovery of total pressure and corresponding thrust performance. Further, the ingested boundary layer increases the flow distortion (a measurement of the quality or uniformity of flow characteristics) at the engine and thereby decreases the stability of engine operation. On the aircraft wing and/or other external surfaces of the aircraft, the boundary layer can increase skin friction and therefore drag. In some instances, the boundary layer can cause premature separation of the flow from the external surface, further increasing drag and/or reducing lift.

As a result of the foregoing drawbacks associated with boundary layers, many aircraft have employed some type of boundary layer removal, reduction, and/or control system to provide for stable engine operation and increased aerodynamic performance. Representative systems include boundary layer diverters, "bump" boundary layer deflectors, boundary layer bypass ducts, vortex generators, and porous surfaces or slots that either bleed boundary layer-flow from the surface, or energize the flow by air injection. Unfortunately, these systems are often complex and can entail a substantial increase in aircraft weight and/or volume.

One recent technique for addressing boundary layer flow is to use a dielectric barrier discharge device to energize and/or redirect the boundary layer flow. These devices operate by ionizing air adjacent to the flow surface in such a way as to generate or direct flow adjacent to the surface. Accordingly, dielectric barrier discharge devices typically include a pair of electrodes separated by a dielectric material. The voltage applied to at least one of the electrodes is typically cycled in a sinusoidal fashion to ionize the adjacent air. While the foregoing approach has been shown to create the desired effect on the boundary layer, there remains a need for devices that better control boundary layer flow and do so in a manner that is more efficient and effective than techniques associated with existing devices.

SUMMARY

The following summary is provided for the benefit of the reader only, and is not intended to limit in any way the scope of the invention as set forth by the claims. Aspects of the present disclosure are directed to an aircraft system that includes an aerodynamic body having a flow surface exposed to an adjacent air stream, and a flow control assembly carried by the aerodynamic body. The flow control assembly can include a first (e.g., upstream) electrode positioned at least proximate to the flow surface, a second (e.g., downstream) electrode positioned proximate to and spaced apart from the first electrode, and a dielectric material between the first and second electrodes. A controller can be coupled to at least one of the first and second electrodes, and is programmed with instructions to direct air-ionizing pulses to the at least one electrode, and apply a generally steady-state signal (e.g., a steady state voltage) to the at least one electrode during intervals between the pulses. In at least some embodiments, the combination of pulses and steady-state signals is expected to increase the effectiveness and/or efficiency of the flow control assembly.

In particular embodiments, the first electrode, the second electrode, and the dielectric material form at least a portion of a plasma actuator, and the flow control assembly can include multiple plasma actuators spaced apart from each other along the flow surface. The aerodynamic body can include an aircraft airfoil, with the first electrode positioned at least proximate to an external surface of the airfoil. In another embodiment, the aerodynamic body includes an air-breathing engine, and the flow surface includes an air inlet flow surface positioned to provide air to the engine via an air inlet aperture. In still further particular embodiments, multiple plasma actuators can be spaced apart from each other along the flow surface, and arranged in a chevron configuration forward of and generally transverse to the inlet aperture.

Other aspects are directed to methods for controlling aircraft air flow, including accelerating air adjacent to an aircraft by directing a series of pulses to at least one of a first electrode and a second electrode spaced apart from the first electrode, while a dielectric material is positioned between the first and second electrodes. The method can further include providing a generally steady-state signal to the at least one electrode during intervals between the pulses.

In particular aspects, the pulses can have a pulse width of about 100 nanoseconds or less (e.g., from about two nanoseconds to about ten nanoseconds). The pulses can be applied with a positive or a negative polarity, while the generally steady-state signal can be applied at a positive polarity of the first electrode relative to the second. The interpulse interval between pulses can be on the order of about one to two microseconds. The air adjacent to the electrodes can be accelerated to a flow velocity of 100 meters per second or more.

DETAILED DESCRIPTION

The following description is directed generally toward systems and methods for controlling flows with electrical pulses, for example, via plasmas generated by dielectric barrier discharge devices or other plasma actuators. Several details describing structures or processes that are well-known and often associated with aspects of these systems and methods are not set forth in the following description for purposes of brevity. Moreover, although the following disclosure sets forth several embodiments of different aspects of the invention, several other embodiments of the invention can have different configurations or different components than those described in this section. As such, the invention may have other embodiments with additional elements or without several of the elements described below with reference to FIGS. 1-9.

Several embodiments of the invention described below may take the form of computer-executable instructions, including routines executed by a programmable computer (e.g., a controller). Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below. Accordingly, the term "computer" as generally used herein, refers to any data processor, and can include controllers, multi-processor systems, processor-based or programmable consumer electronics, network computers, mini-computers and the like.

Figure 1A:
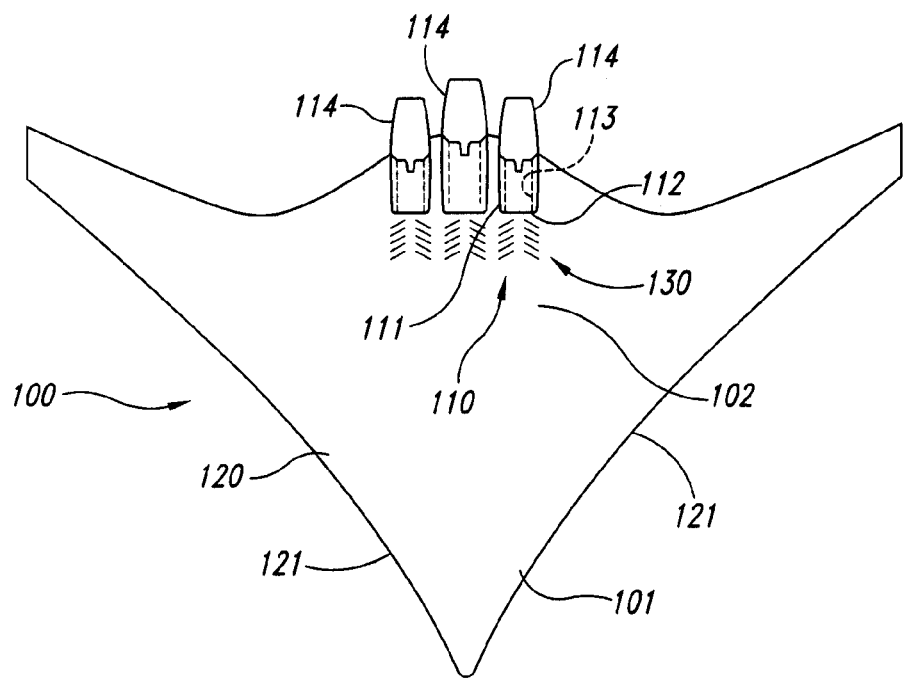
FIG. 1A is a partially schematic plan view of an aircraft having a flow control system in accordance with an embodiment of the invention.

FIG. 1A illustrates a representative aerodynamic body 100 on which a flow control assembly 130 is installed in accordance with an embodiment of the invention. The aerodynamic body 100 can include an aircraft 101 having an airfoil 120 and one or more engines 114 (three are shown in FIG. 1A for purposes of illustration). The aircraft 101 shown in FIG. 1A has a blended wing-body configuration with the engines 114 located aft. In other embodiments, the aerodynamic body 100 can have other configurations capable of atmospheric flight, including, without limitation, tube and wing configurations (typical of commercial transports and private aircraft), missile configurations, or rotorcraft configurations. The aircraft 101 can be manned or unmanned. In a particular embodiment shown in FIG. 1A, the flow control assembly 130 is positioned to control the flow entering the engines 114. In other embodiments, the flow control assembly can be positioned to control the flow over other portions of the aircraft, including the airfoil 120, as will be discussed later.

Air is supplied to the engines 114 via an air induction system 110. The air induction system 110 can include one or more inlets 111 (e.g., one inlet 111 per engine 114), each having an inlet aperture 112 and an inlet duct 113 that directs air in an aft direction to the engine 114. In the configuration shown in FIG. 1A, the inlets 111 are located at a point well aft of a forward leading edge 121 of the airfoil 120. Accordingly, a surface 102 of the aerodynamic body 100 is positioned upstream of the apertures 112 such that intake air moves over the surface 102 prior to being received by the inlets 111. A boundary layer of low velocity air builds up on the surface 102 beginning at the leading edge 121, and moves in a generally aft direction toward the inlets 111. The illustrated flow control assembly 130 is positioned to control the boundary layer air before it enters the inlets 111. Optionally, the flow control assembly 130 can be positioned to control the flow within the inlets 11, in addition to or in lieu of controlling the flow external to the inlets 111.

Figure 1B:
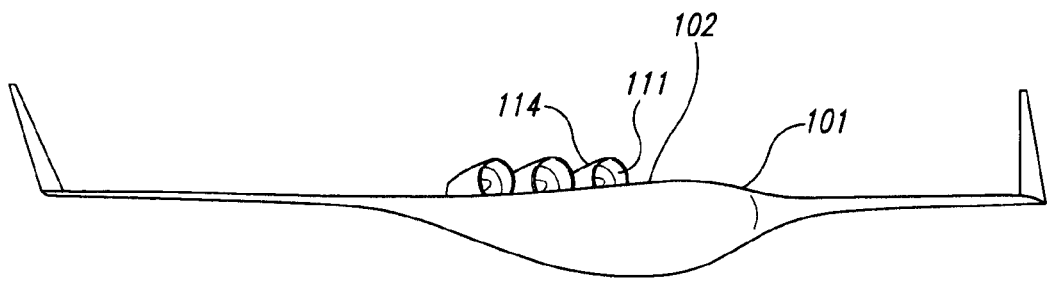
FIG. 1B is a perspective view of the aircraft shown in FIG. 1A.

As shown in FIG. 1B, the inlets 111 can have a generally round shape that may or may not be offset upwardly away from the flow surface 102. When the inlets 111 are offset away from the flow surface 102, a diverter can be positioned between the inlets 111 and the flow surface 102 to remove some or all of the boundary layer flow. However, in many cases, it is desirable not to offset the inlets 111 from the flow surface 102 so as to reduce weight and drag. The flow control assembly 130 (FIG. 1A) can replace the diverter (or at least reduce the size of the diverter) in the foregoing instances, as described below with reference to FIG. 2.

Figure 2:
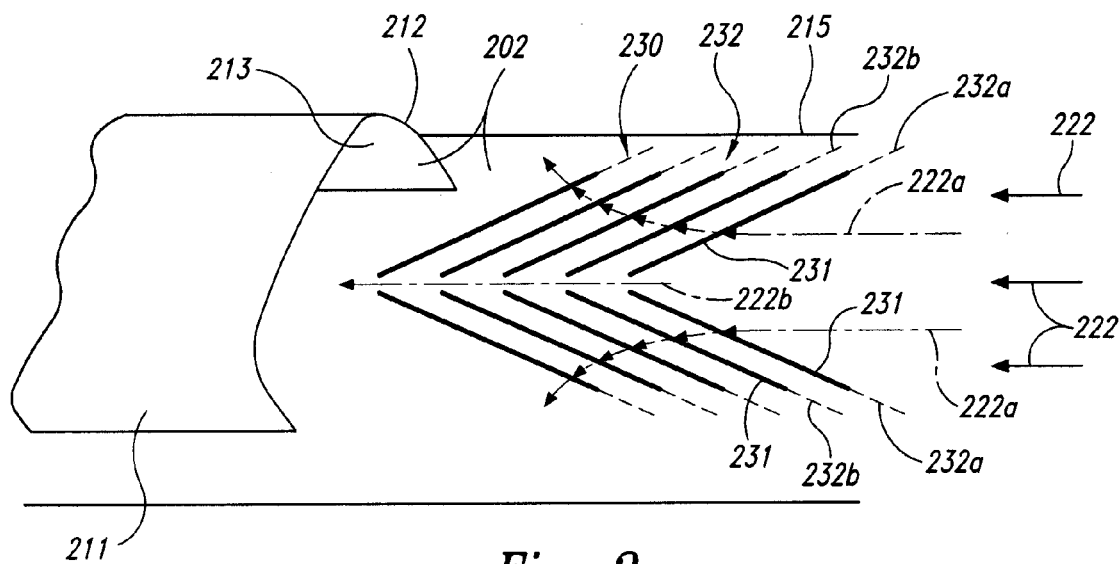
FIG. 2 is a partially schematic illustration of an aircraft inlet having a flow control system configured in accordance with an embodiment of the invention.

FIG. 2 is a top perspective illustration of a portion of an integrated, non-axisymmetric, diverter-less inlet 211. In one aspect of this embodiment, the inlet 211 includes an inlet aperture 212 and an inlet duct 213 positioned aft of the inlet aperture 212. The inlet aperture 212 has a non-axisymmetric shape and is positioned aft of a forebody surface 215. Accordingly, a flow surface 202 directing air into the inlet aperture 212 and then aft to the engine (not visible in FIG. 2) can include portions of the forebody 215 and/or portions of the inlet duct 213.

A flow control assembly 230 is positioned at the flow surface 202 to control the flow entering the inlet 211. In a particular aspect of an embodiment shown in FIG. 2, the flow control assembly 230 is installed at the forebody 215. In other embodiments, portions of the flow control assembly 230 may be installed in the inlet duct 213, in addition to or in lieu of the location at the forebody 215. The flow control assembly 230 in the illustrated embodiment includes multiple actuators 231 (e.g., dielectric barrier discharge devices, plasma actuators, or other electrically operated, ionizing devices) arranged forward of the inlet 211. Individual actuators 231 may be arranged in rows 232 (two of which are specifically identified as rows 232a and 232b) that are oriented at least partially transverse to incoming flow streamlines 222 and to the inlet aperture 212. In still a further particular aspect of the arrangement shown in FIG. 2, the rows 232 can be angled relative to the incoming streamlines 222 so as to form a "chevron" pattern. Accordingly, at least some of the incoming boundary layer flow can be directed outboard, away from the inlet 211 (as indicated by flow streamlines 222a) and/or some of the flow directed into the inlet 211 can be energized (as indicated by streamline 222b). The number of rows 232 of actuators 231 can be selected to be as small as possible while still providing the desired boundary layer diversion and/or energizing effect. For example, the forebody 215 can include five rows 232 of actuators 231 positioned forward of the inlet 211. In other embodiments, the number of rows can be different, depending upon the specific geometry into which the actuators 231 are integrated. It is expected that due to the increased efficiency of the actuators 231, the number of actuators 231 (and rows 232 of actuators 231) can be reduced when compared to existing arrangements. Further details of the expected mechanisms by which the improved actuator efficiencies are achieved are described later with reference to FIGS. 4-7B.

Figure 3A:
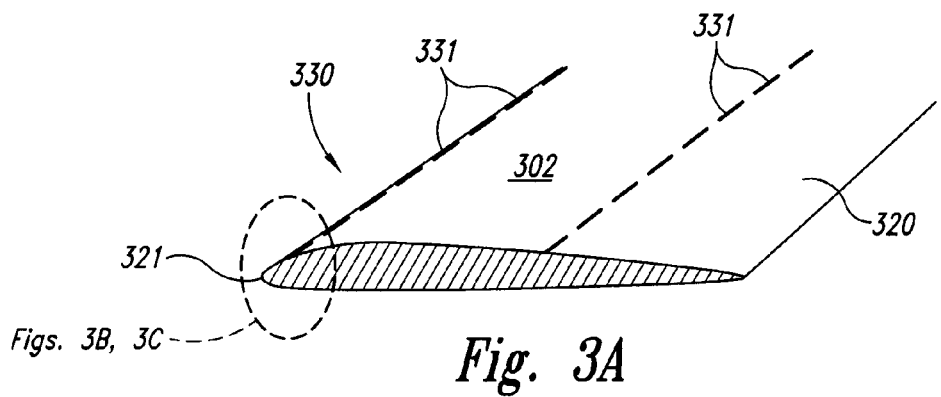
FIGS. 3A-3C illustrate airfoils having flow control systems configured in accordance with further embodiments of the invention.
Figure 3B:
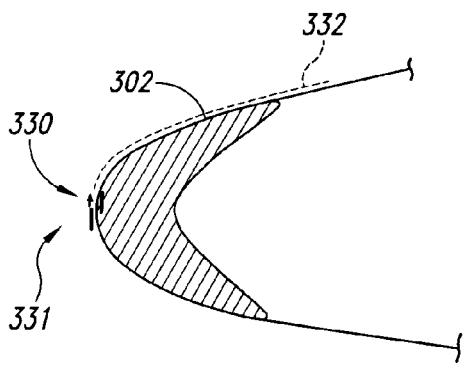
Figure 3C:
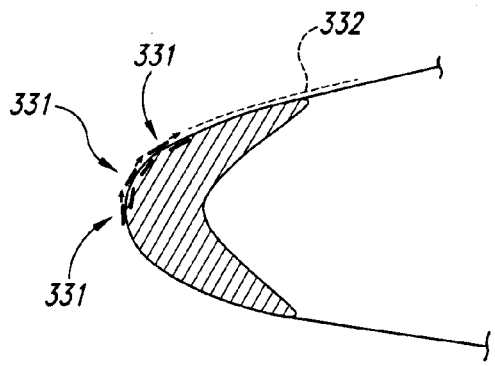

As noted above with reference to FIG. 1A, the flow control assemblies can be used to control flow other than flow entering an aircraft inlet. FIGS. 3A-3C illustrate representative flow control assemblies installed on an airfoil to energize such flows. Beginning with FIG. 3A, a flow control assembly 330 is installed on an airfoil 320 having a flow surface 302 with a leading edge 321. The flow control assembly 330 can include actuators 331 arranged in a single row at or near the leading edge 321. In an alternate arrangement, the actuators 331 can be arranged in a single row aft of the leading edge 321, as is also shown in FIG. 3A. It is expected that the single row of actuators 331 (whether located at or near the leading edge 321, or well aft of the leading edge 321) will be sufficient to energize the boundary layer passing over the flow surface 302 in a manner that reduces skin friction and/or reduces the tendency for the flow to separate from the flow surface 302. As discussed above, the reduced number of actuator rows, relative to at least some existing systems, is expected to improve the overall efficiency of the flow control assembly 330a.

FIG. 3B is a partially schematic, cross-sectional illustration of the airfoil 320, illustrating one actuator 331 from the row of actuators 331 positioned at the leading edge 321. In this arrangement, the actuator 331 is the only actuator 331 carried by the airfoil 320 at a streamwise line 322 that intersects the actuator 331. By positioning the actuator 331 at or near the leading edge 321 (e.g., at or near the stagnation point), it is expected that the flow control assembly 330 will improve the performance of the airfoil 320 at angles of attack. In particular, it is expected that the flow control assembly 330 will reduce the likelihood for flow separation near the leading edge 321 at high angles of attack.

In other embodiments, additional rows of actuators may be added to the airfoil, depending upon airfoil geometry and/or expected flight conditions. For example, as shown in FIG. 3C, the actuators 331 can be arranged in two or three rows proximate to the leading edge 321. It is expected that the number of rows of actuators 331 having characteristics in accordance with embodiments of the invention will be less than the number of rows of actuators having more conventional characteristics. The actuator characteristics are now described with reference to FIGS. 4-7B.

Figure 4:
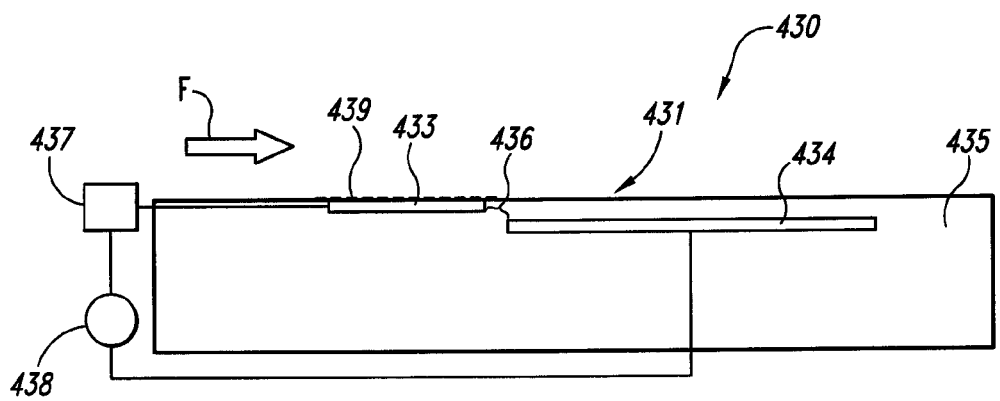
FIG. 4 is a schematic illustration of a flow control system, including components of an actuator, configured in accordance with an embodiment of the invention.

FIG. 4 is a partially schematic, cross-sectional illustration of a flow control assembly 430 that includes a representative actuator 431 configured in accordance with an embodiment of the invention. The flow control assembly 430 can include more than one actuator 431, but a single actuator 431 is shown in FIG. 4 for purposes of illustration. The actuator 431 can include a first electrode 433, a second electrode 434, and a dielectric material 435 positioned between the first and second electrodes 433, 434. Accordingly, the first and second electrodes 433, 434 are separated by a gap 436.

In a particular embodiment, the first electrode 433 is located upstream (with reference to a local air flow direction F) from the second electrode 434, and the upper surface of the first electrode is typically flush with the surrounding flow surfaces. The first electrode 433 is also typically "exposed" to the flow. As used in this context, "exposed" means that the first electrode 433 is in direct electrical contact with the flow, or at least more direct electrical communication with the flow than is the second electrode 434. The exposed first electrode 433 can accordingly include a protective coating 439 or other material that restricts or prevents erosion due to environmental conditions, without unduly impacting the electrical communication between the first electrode 433 and the adjacent flow, e.g., without unduly impacting the ability to provide direct current coupling between the first electrode 433 and the adjacent flow. In other embodiments, the material forming the first electrode 433 can be selected to have both suitable electrical conductivity and suitable resistance to environmental factors. A representative material includes stainless steel.

In particular embodiments, the first electrode 433 can include a conductive environmental coating. For example, the first electrode 433 can include a coating formed from a thin layer of tungsten, tungsten carbide (or another tungsten alloy), nichrome or stainless steel. In other embodiments, the coating can include a semiconductive material becomes conductive as the high voltages described above are applied to the first electrode 433. For example, the first electrode 433 can include a silicon or gallium arsenide bulk material treated with a suitable dopant (e.g., boron or phosphorus, in the case of silicon). In other embodiments, other suitable conductive and/or semiconductive materials can be applied to the first electrode. In any of these embodiments, the material can be selected to provide the necessary level of conductivity and the necessary resistance to environmental conditions, including resistance to rain erosion, oxidation and exposure to fuel and/or ice protection chemicals.

It is expected that the majority of the field lines emanating from the first electrode 433 will emanate from the trailing edge of the electrode. Accordingly, in at least some cases, the environmental coating can be applied to the majority of the exposed surface of the first electrode 433, leaving only a small, aft portion of the first electrode 433 uncoated. In such cases, the coating may be selected to be entirely non-conductive (e.g., a dielectric coating) without causing undue interference with the ionizing electrical field emanating from the first electrode 433.

The second electrode 434 can be covered or at least partially covered with the dielectric material 435, for example, to prevent direct arcing between the two electrodes. The first electrode 433 or the second electrode 434 is coupled to a controller 437, which is in turn coupled to a power supply 438 to control the power delivered to the first electrode 433 or the second electrode 434. The other electrode 433 or 434 may also be coupled to the power supply 438 and/or the controller 437, or may simply be grounded. The controller 437 can include a computer having a computer-readable medium programmed with instructions to direct a signal waveform with both pulses and a steady state bias to the first electrode 433, in a manner that is expected to enhance the efficiency and/or the effectiveness of the actuator 431.

Figure 5:
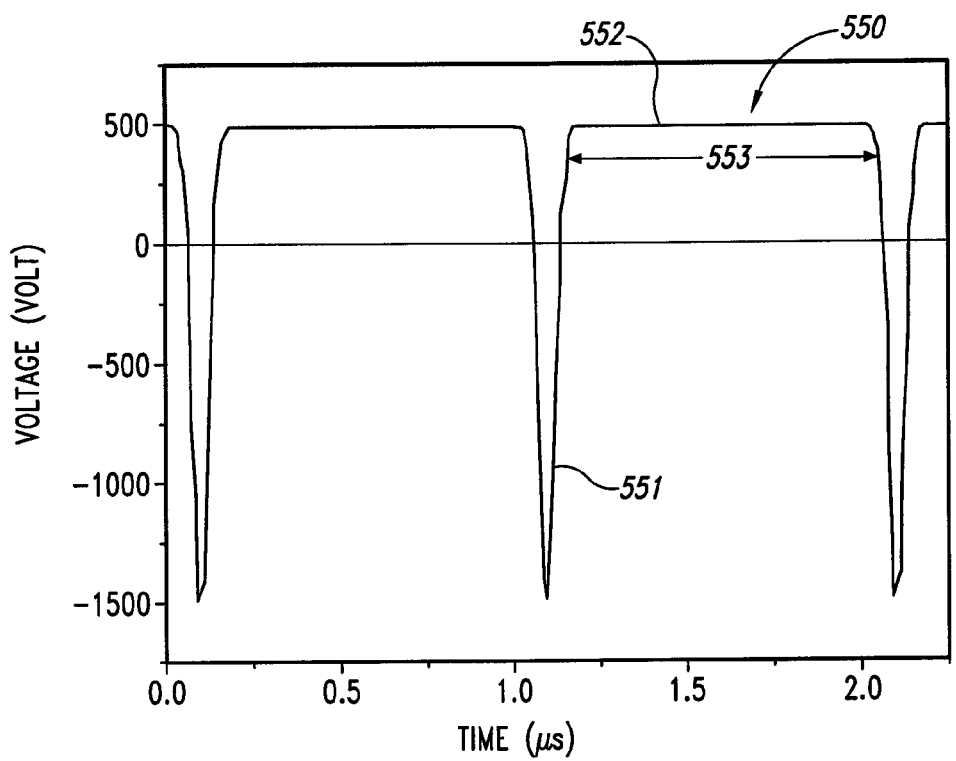
FIG. 5 illustrates a waveform applied to an electrode during a flow control process in accordance with an embodiment of the invention.

FIG. 5 illustrates a representative waveform 550 (e.g., a voltage waveform) provided by the controller 437 (FIG. 4) to the first electrode 433 (FIG. 4). The waveform 550 can include a series of relatively short pulses 551 separated by an interpulse interval 553. It is understood that the pulses 551 shown in FIG. 5 represent ideal pulses, and that actual pulses may have some ringing, oscillations, or other non-uniformities due to factors such as impedance mismatches or limitations of the pulse generation device. The waveform 550 can also include a generally steady-state portion 552 (e.g., a bias) applied during the interpulse interval 553. The pulses 551 and the steady state portions 552 can have opposite polarities. For example, the pulses 551 can be applied at a potential of −1500 volts, and the steady state signal portion can be applied at a potential of +500 volts. The pulses 551 can be relatively short, e.g., about 100 nanoseconds or less in particular embodiments, 50-100 nanoseconds in further particular embodiments, and generally from about 2 nanoseconds to about 4 nanoseconds in still further particular embodiments. The interpulse interval 553 can have a value of about 1 microsecond, as shown in FIG. 5, and other values (e.g., about 2 microseconds or about 10 microseconds) in other embodiments. It is expected that this arrangement can accelerate the adjacent air to a flow velocity of up to and in excess of 100 meters per second (e.g., about 50 meters per second in a particular embodiment). Accordingly, because the boundary layer in supersonic flows has a subsonic region near the wall, the arrangement may have applications to both subsonic and supersonic flows.

Without being bound by theory, the following discussion describes the manner in which it is believed the actuator 431 operates to accelerate the local flow. This expectation is based upon computations described in greater detail in AIAA Publication 2006-1204 by Likhanskii et al., titled "Modeling of Interaction Between Weakly Ionized Near-Surface Plasmas and Gas Flow," presented at the 44$^{th}$ AIAA Aerospace Sciences Meeting and Exhibit, Jan. 9-12, 2006, and incorporated herein by reference. The following explanation represents an expected mode of operation, but the invention is not necessarily limited by this explanation.

The following description refers to FIGS. 4 and 5 together. During the negative pulse 551, an ionization avalanche develops, quickly removing electrons from the local gas and depositing them onto the dielectric material 435 overlaying the second electrode 434. Positive ions (e.g., a plasma) are then left behind and are attracted to the downstream, negatively charged dielectric material 435. To push the gas along the surface in the downstream direction (e.g., away from the first electrode 433 and toward the second electrode 434, as indicated by arrow F), the positive steady-state signal portion 552 is applied to the first electrode 433. As the positive ions migrate away from the first electrode 433 and toward the second electrode 434, they drag neutral molecules along with them, thus increasing the volume of flow accelerated by the electrodes 433, 434 beyond merely the volume occupied by the charged ions. It is expected that the downstream flow occurs (perhaps to differing degrees) during both the pulse portion of the applied signal and the steady state portion of the applied signal.

The electrons present at the downstream dielectric material 435 can be removed from the surface by (a) recombination with the positively charged ions that arrive at the surface and (b) secondary emission (due to the impact of energetic positive ions). This operation can be generally similar to that of a cathode in a glow discharge process. Because the electrons are removed from the surface by the recombination process described above, the dielectric material 435 loses its negative charge. Accordingly, the dielectric material 435 is then recharged or replenished with electrons by the next pulse 551. The short duration of the pulses 551 can at least reduce the tendency for the initially downstream-directed flow to reverse and move upstream. In this manner, very rapid pulses (at frequencies on the order of tens to hundreds of kHz), with very short pulse widths (as described above) can drive flow in the downstream direction F, energizing and/or redirecting the boundary layer air adjacent to the dielectric material 435.

In particular embodiments, the individual pulses in the pulse train are selected to be of sufficiently high voltage to establish, with good efficiency, an ionized region in the air and on the surfaces surrounding the electrodes 433, 434, and the pulses are selected to be of sufficiently short duration and appropriate amplitude, temporal shape and polarity to establish a desired distribution of that ionization. Following the establishment of this ionization distribution after each of the individual pulses, a body force is transferred to the surrounding neutral gas through interactions with the ions. These interactions between ions and the neutral gas molecules can be augmented by the application of a steady state voltage differential between the electrodes 433, 434. The repetition rate of the pulses and the magnitude of the steady state voltage can be selected to provide a desired average body force up to the limit defined by the constraints of the particular configuration.

Figure 6A:
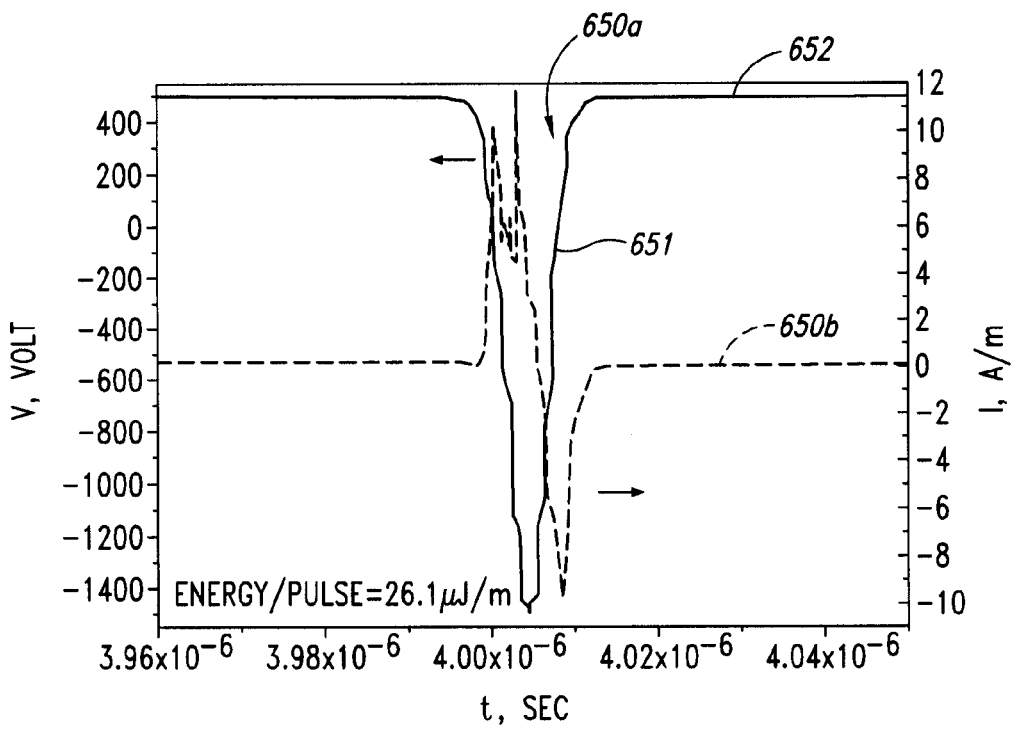
FIG. 6A illustrates a waveform in accordance with another embodiment of the invention.
Figure 6B:
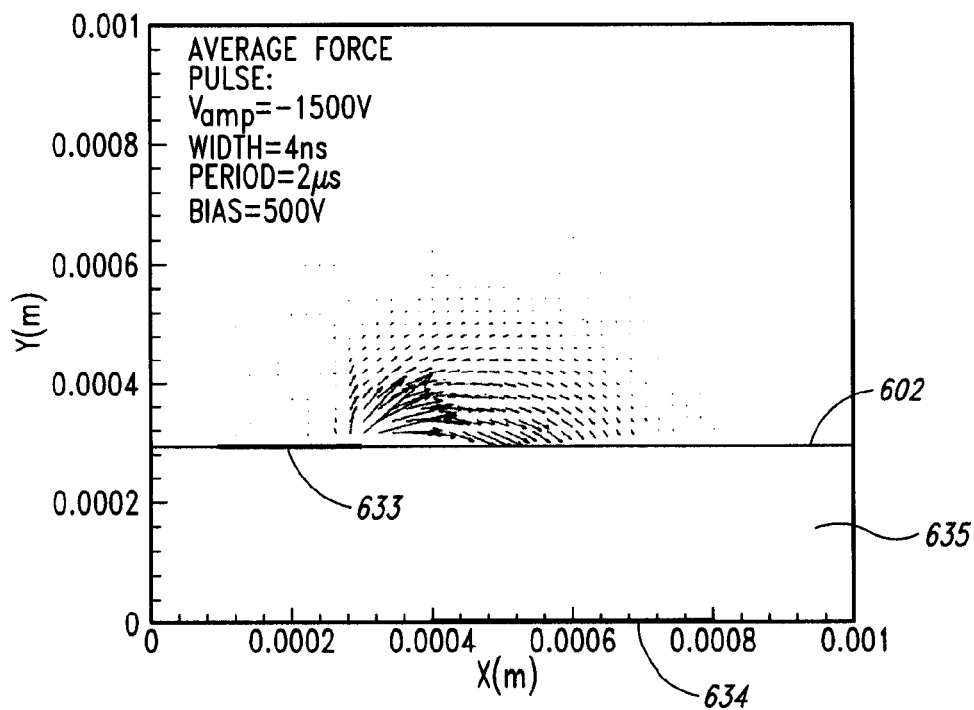
FIG. 6B illustrates an average force acting on neutral gas proximate to an actuator device to which the waveform shown in FIG. 6A is applied.

FIGS. 6A and 6B illustrate computational results predicting the effects of a pulse/steady-state-bias waveform in accordance with an embodiment of the invention. FIG. 6A illustrates a voltage waveform 650a having a pulse 651 with an amplitude of −1500 volts, a pulse width of approximately 4 nanoseconds, a repetition rate of approximately 500 kHz, and an interpulse interval of about 2 microseconds. During the interpulse interval, the electrode is biased with DC current at a potential of +500 volts. A current waveform 650b illustrates the corresponding current associated with the voltage waveform 650a.

FIG. 6B illustrates a flow surface 602, a first electrode 633, a second electrode 634, and an interpositioned dielectric material 635. FIG. 6B also illustrates representative dimensions for the foregoing components. For example, the first electrode 633 can have a length of about 200 microns and the second electrode 634 can have a length of about 400 microns. The two electrodes can have a streamwise spacing of about 100 microns, and the thickness of the dielectric material 635 overlaying the second electrode 634 can be about 300 microns. The dielectric material 635 can have a permittivity of about 5. The foregoing representative dimensions can have other values in other embodiments, depending on the particular application.

Force vector arrows shown in FIG. 6B indicate the average force acting on neutral gas molecules at a grid of locations adjacent to the first electrode 633 during one cycle of the voltage waveform 650a described above with reference to FIG. 6A. As is seen from the force vector arrows illustrated in FIG. 6B, the average force acting on the neutral gas is in a downstream direction (toward the second electrode 634), and in a generally downward and/or suction direction (toward the flow surface 602). Accordingly, the flow is directed both downstream, which accelerates the flow, and toward the flow surface 602, which can reduce the tendency for the flow to separate.

Figure 7A:
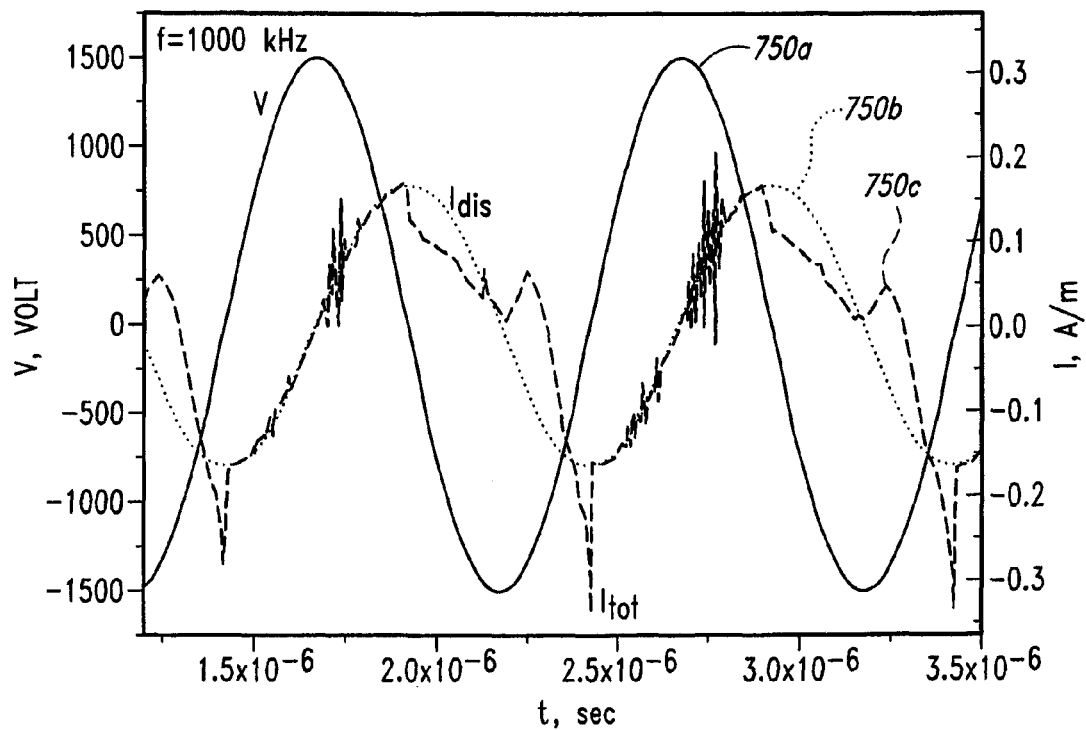
FIG. 7A illustrates a sinusoidal waveform applied to an electrode in accordance with a conventional process.
Figure 7B:
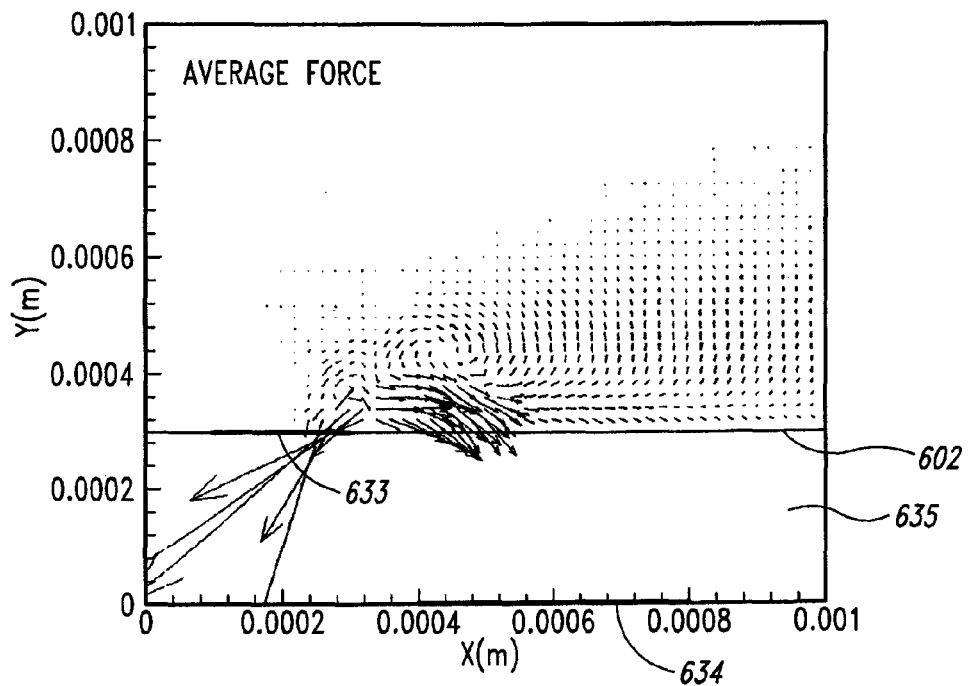
FIG. 7B illustrates average forces acting on a neutral gas proximate to an actuator device to which the waveform shown in FIG. 7A is applied.

For purposes of comparison, FIGS. 7A and 7B illustrate corresponding predicted waveforms and force vectors associated with a conventional, sinusoidally varying voltage waveform. For example, FIG. 7A illustrates a voltage waveform 750a varying in a sinusoidal manner, a calculated total current waveform 750b associated with the voltage waveform 750a, and a displacement current waveform 750c. FIG. 7B illustrates the predicted average force acting on the neutral gas adjacent to the first electrode 633 during one cycle having the characteristics described above with reference to FIG. 7A. As seen in FIG. 7B, the forces acting on the neutral gas have a significant upstream component, in addition to a downstream component. It is believed that this result is due to the relative symmetry of the biphasic pulses applied to the first electrode 633. The expected effect of the significant upstream force component is to reduce the efficiency with which the flow is energized because it counteracts the downstream force. In other words, it is believed that much of the benefit of the downstream force resulting from the negative sinusoidal pulse is lost when the force on the neutral gas is reversed during the positive sinusoidal pulse. By contrast, the force applied to the neutral gas using the waveform shown in FIG. 7A is more predominantly downstream. As is also seen by comparing FIGS. 6B and 7B, the average force component in the "suction" direction (e.g., toward the flow surface 602), which is generally desirable for reducing flow separation, is expected to be less when the asymmetric waveform 650a (FIG. 6A) is applied than when the symmetric, sinusoidal waveform 750a (FIG. 7A) is applied. However, it is expected that this effect is more than offset by the net increase in the downstream force shown in FIG. 6B.

A feature of at least some of the foregoing embodiments is that waveforms having characteristics that include relatively short pulses followed by relatively longer, steady-state DC biases increase the net downstream force on the adjacent gas. An expected advantage of this arrangement is that it increases the efficiency with which the actuators direct the adjacent gas. As a result, the number of actuators required to achieve a given level of control over a boundary layer flow can be reduced. This in turn can reduce the weight and volume of the actuators, and can also reduce the power required by the actuators. All three factors can increase the overall efficiency with which an aircraft having such actuators is operated. In particular embodiments, it is expected that the tangential (e.g., downstream) forces resulting from the application of such waveforms can be at least three orders of magnitude greater than the corresponding forces resulting from a sinusoidal voltage waveform at a similar voltage amplitude and frequency. This can correspond to a 30-fold increase in the induced gas velocity. For example, as discussed above, this arrangement can produce gas velocities on the order of tens and potentially hundreds of meters per second. In a further particular embodiment, the power required to produce a velocity of about 100 m/s using such waveforms can be at least ten times less than that required by an actuator delivering a sinusoidal waveform and producing similar or significantly lower velocities.

Another expected advantage of at least some of the foregoing embodiments is that the relatively short duration of the pulses applied to the electrode(s) may enable the magnitude of the voltage applied during the pulses to be increased, when compared with the maximum voltage applied during a conventional sinusoidal pulse. The higher voltage pulses are expected to further improve the efficiency of the ionization process, and therefore the efficiency with which the boundary layer air is accelerated. In a particular embodiment, increasing the peak voltage during the pulses from −1500 volts to −2000 volts is expected to increase the force applied on the neutral gas molecules by a factor of about 2.6. At particular elevated voltage amplitudes (e.g., about 3 kV), the plasma can develop into a streamer-like regime, and the force on the gas can be transferred mainly due to significant charge non-neutrality during the streamer decay stage.

Still another feature of at least some of the foregoing embodiments is that the locations of the actuators may facilitate functions in addition to boundary layer control functions. For example, actuators positioned at or near the leading edge of an airfoil (as shown in FIGS. 3A-3C) may be used to provide an ice protection function as well as a flow control function. In particular embodiments, the electrodes forming these actuators can include nichrome or another suitable material that heats up under high applied current to melt ice and/or prevent ice from forming. Accordingly, this arrangement can provide a de-ice and/or an anti-ice function. A particular advantage of this arrangement is that ice may be likely to form at the same location as benefits from flow control (e.g., at or near the airfoil leading edge). Accordingly, the same actuator can be used to provide ice protection and flow control to the same region of flow. Another advantage is that the ice and/or water proximate to the electrodes is expected to be heated not only by the electrodes themselves, but also directly by current passing between the electrodes. In other words, the water and/or ice can form part of the electrical circuit that includes the electrodes.

An arrangement generally similar to that described above may be used at inlet leading edges and/or other aircraft surfaces that can benefit from both flow control and ice protection. In any of these embodiments, the controller can be programmed with at least two sets of instructions: one for directing high voltage signals to control the adjacent flow, and another for directing signals (e.g., high current signals) to provide for ice protection. The high voltage signals are expected to be applied in the manner described above, e.g., short, high-voltage pulses with interpulse steady-state biases. The waveform applied during an anti- or de-icing function may be different, e.g., a more uniformly varying AC waveform. The ice protection waveform may be automatically triggered by an ice detector or incipient icing detector coupled to the controller, or the ice protection waveform may be triggered manually, e.g., by an input signal provided by a pilot.

The signal characteristics described in the context of the foregoing embodiments are representative of values expected to produce enhanced flow control, but may have other values in other embodiments. For example, the applied voltage can range from about 1 kV to about 30 kV, and the applied frequency can range from about 10 kHz to about 1 MHz. The pulse shape can be generally symmetric (e.g., rising at the same rate is it falls) or can have other shapes, for example a sawtooth shape in which the pulse falls more gradually than it rises. The electrodes can also have different relative spacings. For example, the second electrode leading edge can be at the same streamwise location as the first electrode trailing edge. The second electrode can be located under a greater depth of dielectric material, for example, about 60 millimeters.

Figure 7C:
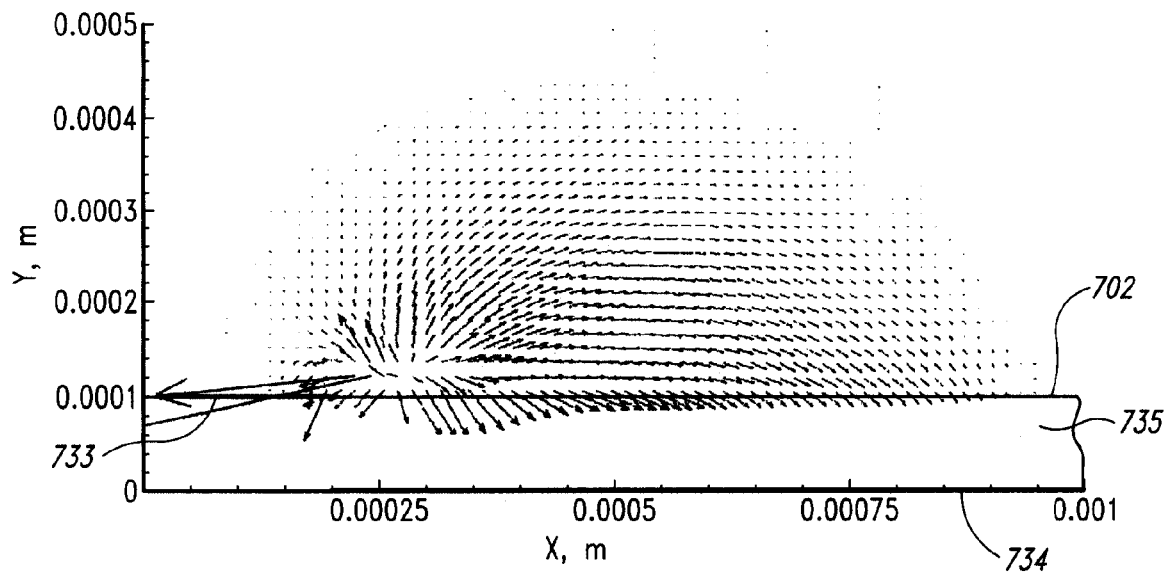
FIG. 7C illustrates average forces acting on a neutral gas proximate to an actuator device to which a waveform having both positive pulses and positive biases is applied, in accordance with another embodiment of the invention.

FIG. 7C illustrates an actuator configured and operated in accordance with another embodiment of the invention. The actuator can includes a first electrode 733 spaced apart from a second electrode 734 by a dielectric material having a thickness of about 100 microns. The first electrode can have a streamwise length of about 150 microns and the second electrode can have a streamwise length of about 800 microns. The trailing edge of the first electrode 733 is co-located in a streamwise direction with the leading edge of the of the second electrode 734, though offset in a perpendicular direction by the thickness of the dielectric material.

The waveform of the signal applied to the first electrode 733 can include pulses and a steady state bias, as discussed above, but in a particular embodiment, pulses and the bias can be applied at voltages having the same polarity, though different values. For example, in an embodiment shown in FIG. 7C, the pulses be applied at a potential of 4.5 kV, with a pulse width of 4 nanoseconds and a frequency of 500 kHz. The steady-state bias can be applied at a potential of 0.5 kV. As shown in FIG. 7C, the resulting average force applied to the adjacent neutral gas is expected to be generally downstream and in the suction direction.

The physics of the downstream force acting on the gas shown in FIG. 7C is expected to be different from the case when negative voltage pulses are applied to the first electrode 733. When a positive nanosecond pulse is applied to the first electrode 733, at some voltage, the electric field near the edge of the first electrode 733 will be sufficient for the initiation of cathode-directed streamer propagation. During the pulse, the streamer propagates along the dielectric material 735 until the electric field at the leading edge (head) of the streamer is not sufficient to produce further ionization in front of it. At that point the streamer stops. From the theory of streamers and from calculations, it is well-known that the body of the streamer is quasi-neutral, but the head of the streamer carries a positive charge in order to displace the electric potential and produce the ionization in front of it. Therefore, after the pulse there will be positive ion cloud in the front part of the decaying streamer. An applied DC bias after the pulse forces this cloud to move downstream and push the gas.

Figure 8:
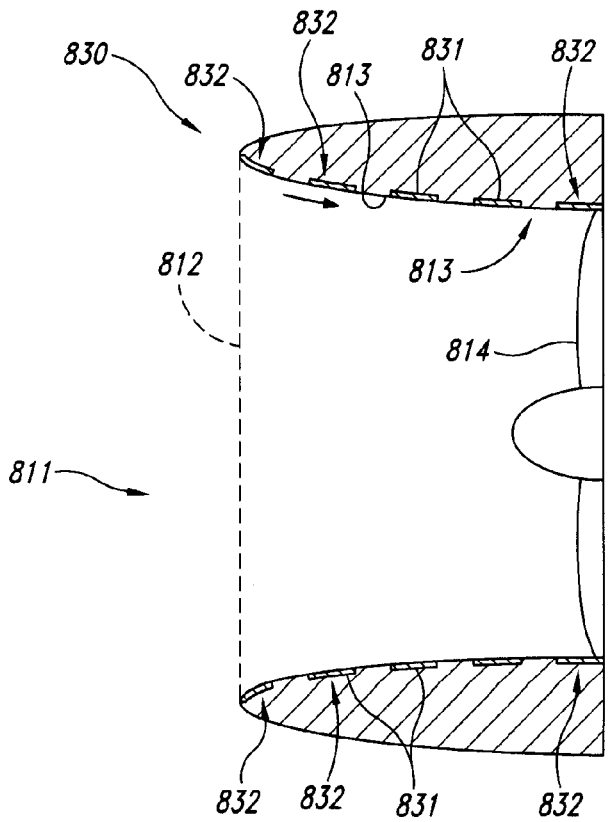
FIG. 8 is a cross-sectional illustration of an inlet having a flow control assembly configured in accordance with another embodiment of the invention.
Figure 9:
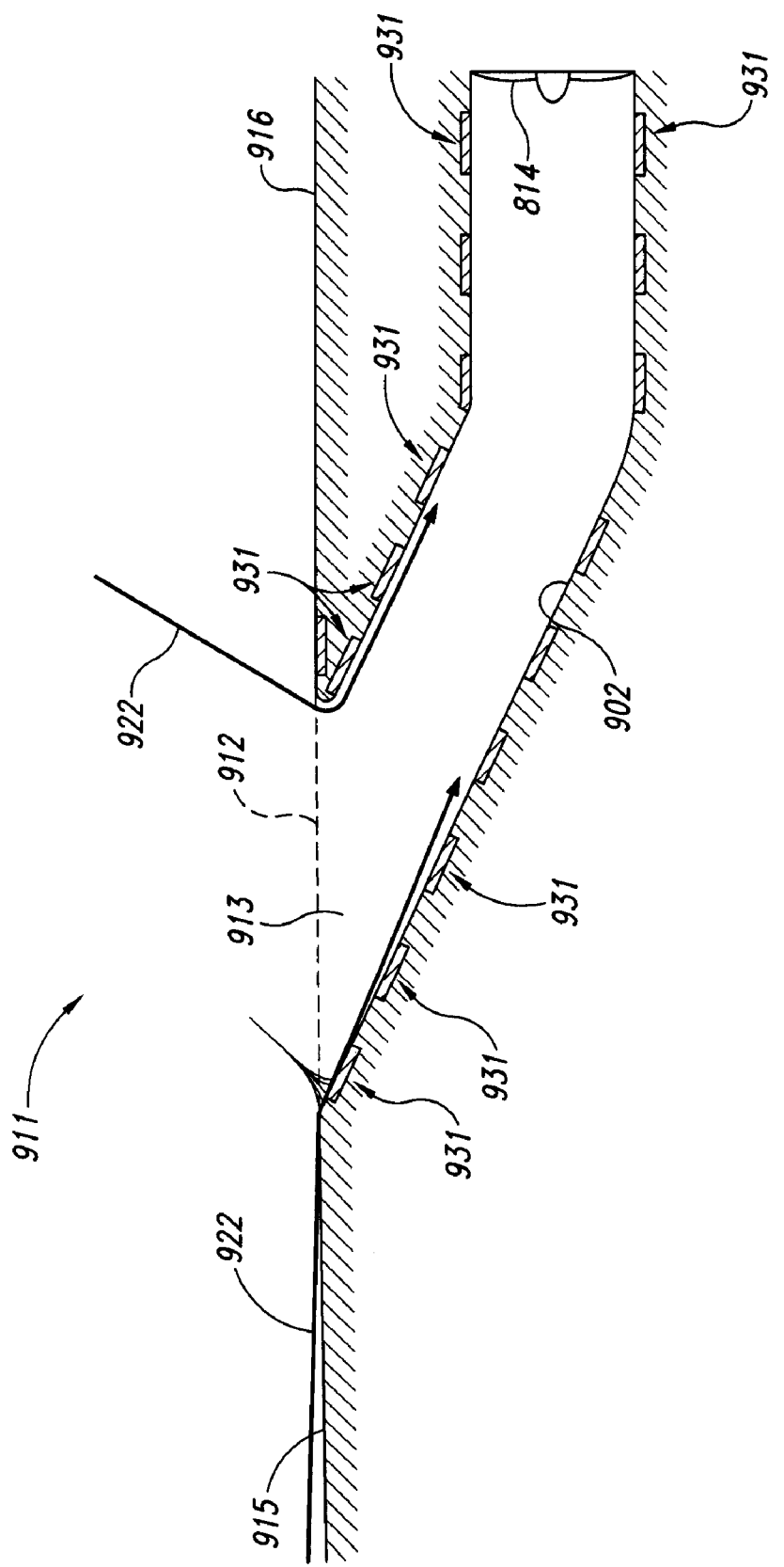
FIG. 9 is a partially schematic, cross-sectional side view of an inlet having a flow control assembly configured in accordance with still another embodiment of the invention.

FIGS. 8 and 9 illustrate inlets having flow control assemblies configured in accordance with other embodiments of the invention. For example, FIG. 8 illustrates a generally axisymmetric inlet 811 (such as is typically used on a commercial jet aircraft) having a generally circular inlet aperture 812 and a generally axisymmetric inlet duct 813 positioned forward of an engine 814. An associated flow control assembly 830 includes actuators 831 positioned in multiple circumferential rows 832 between the inlet aperture 812 and the engine 814. For purposes of illustration, only the top-most and bottom-most actuators 831 are shown for each row 832. Each actuator 831 can have a configuration generally similar to that described above with reference to FIG. 4, and can have applied to it a waveform generally similar to any of those described above with reference to FIGS. 5-6B, 7C. The actuators 831 can be arranged in a series of five rows, as shown in FIG. 8, or fewer rows, as may be possible due to the increased efficiency with which the actuators 831 operate. In any of these embodiments, the effect of the actuators 831 is to control the flow entering the inlet 811 so as to reduce the likelihood for flow separation, increase the total pressure recovery, and/or reduce flow distortion at the engine entrance.

FIG. 9 illustrates another representative inlet 911 having a forebody 915 positioned forward of an inlet aperture 912, and an adjacent or aft surface 916 positioned aft of the aperture 912. Actuators 931 may be positioned along the corresponding flow surface 902 within the inlet duct 913 to energize the boundary layer flow, and in particular, to prevent flow separation as the flow turns into the inlet duct 913 from the forebody 915 and from regions aft of the inlet aperture 912 (indicated by streamlines 922). Optionally, the actuators 931 may also be installed at the forebody 915. The number of actuators 931 and associated rows 932 can be reduced from other arrangements, based upon the increased efficiency of the actuators 931. Other configurations and installations of flow control devices are disclosed in pending U.S. application Ser. No. 11/403,252, assigned to the Boeing Company, titled "Inlet Distortion and Recovery Control System," filed Apr. 12, 2006 and incorporated herein in its entirety by reference.

From the foregoing, it will be appreciated that specific embodiments have been described herein for purposes of illustration, but that various modifications may be made without deviating from the invention. For example, the plasma actuators described above may be installed on aircraft having configurations other than those specifically identified in the Figures. In other embodiments, the plasma actuators may be installed in non-aircraft contexts, and/or may be used to pump gases other than air. The plasma actuators themselves may have configurations different than those shown schematically in the Figures. The pulse characteristics and other waveform characteristics may also be different than those specifically identified in the foregoing examples. For example, the pulses and steady-state signals were described in several instances in the context of applied voltage. In other embodiments, other characteristics of the electrical signal (e.g., current) can be pulsed and held steady. Certain aspects of the invention described in the context of particular embodiments may be combined or eliminated in other embodiments. For example, the "chevron" configuration of actuators shown in FIG. 2 may be applied to the forebody shown in FIG. 9. Multiple actuators and/or actuator assemblies can be installed on a single aircraft to address both inlet airflow and airfoil airflow. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft system, comprising:
   an aerodynamic body having a flow surface exposed to an adjacent airstream; and
   a flow control assembly that includes:
      a first electrode positioned at least proximate to the flow surface;
      a second electrode positioned proximate to and spaced apart from the first electrode;
      a dielectric material between the first and second electrodes; and
      a controller coupled to at least one of the first and second electrodes, the controller being programmed with instructions to direct air-ionizing pulses to the at least one electrode, and apply a non-ionizing generally steady-state bias voltage signal to the at least one electrode during intervals between the pulses.

2. The system of claim 1 wherein the first electrode is exposed to the adjacent airstream and wherein the dielectric material is positioned between the second electrode and the adjacent airstream.

3. The system of claim 1 wherein the first electrode, the second electrode and the dielectric material form at least a portion of a plasma actuator, and wherein the flow control assembly includes multiple plasma actuators spaced apart from each other along the flow surface.

4. The system of claim 1 wherein the flow control assembly is configured to accelerate an adjacent airflow to at least 100 m/s, and wherein a power consumption of the plasma actuator assembly is at least ten times less than that of a plasma actuator assembly having a controller that delivers symmetric, biphasic pulses producing the same airflow velocity.

5. The system of claim 1 wherein the aerodynamic body includes an aircraft airfoil, and wherein the flow surface includes an external surface of the airfoil.

6. The system of claim 5 wherein the first electrode, the second electrode and the dielectric material form at least a portion of a plasma actuator, and wherein the plasma actuator is the only plasma actuator carried by the airfoil along a generally streamwise line that intersects the plasma actuator.

7. The system of claim 6 wherein the plasma actuator is positioned at least proximate to a leading edge of the airfoil.

8. The system of claim 5 wherein the first electrode, the second electrode and the dielectric material form at least a portion of a plasma actuator, and wherein the plasma actuator is one of only two plasma actuators carried by the airfoil along a generally streamwise line that intersects the two plasma actuators.

9. The system of claim 1 wherein the aerodynamic body includes an airbreathing engine, and wherein the flow surface includes an air inlet flow surface positioned to provide airflow to the engine via an air inlet aperture.

10. The system of claim 9 wherein the flow surface is positioned forward of the inlet aperture to direct flow into the inlet aperture.

11. The system of claim 9 wherein the first electrode, the second electrode and the dielectric material form at least a portion of a plasma actuator, and wherein the system includes multiple plasma actuators spaced apart from each other along the flow surface.

12. The system of claim 9 wherein the flow surface includes no more than five rows of plasma actuators positioned forward of and generally transverse to the inlet aperture.

13. The system of claim 12 wherein each row of plasma actuators includes multiple plasma actuators.

14. The system of claim 13 wherein each row of actuators includes two actuators arranged in a chevron shape.

15. The system of claim 1 wherein the first electrode includes at least one of a conductive and a semiconductive protective coating.

16. The system of claim 15 wherein the protective coating includes silicon and a dopant.

17. The system of claim 15 wherein the first electrode includes a conductive coating comprising at least one of tungsten and nichrome.

18. A plasma actuator system, comprising:
a first electrode;
a second electrode positioned proximate to and spaced apart from the first electrode;
a dielectric material between the first and second electrodes; and
a controller coupled to at least one of the first and second electrodes, the controller being programmed with instructions to direct air-ionizing pulses to the at least one electrode, and apply a non-ionizing generally steady-state bias voltage signal to the at least one electrode during intervals between the pulses.

19. The system of claim 18, further comprising an aircraft having a flow surface exposed to an adjacent fluid flow field, and wherein the at least one electrode is positioned at least proximate to the flow surface.

20. The system of claim 19 wherein the flow surface includes an external surface of an airfoil.

21. The system of claim 20 wherein the first electrode, the second electrode and the dielectric material form at least a portion of a plasma actuator, and wherein the plasma actuator is the only plasma actuator carried by the airfoil along a generally streamwise line that intersects the plasma actuator.

22. The system of claim 19 wherein the flow surface includes an air inlet flow surface positioned to provide air to an airbreathing aircraft engine via an inlet aperture.

23. The system of claim 22 wherein the first electrode, the second electrode and the dielectric material form at least a portion of a plasma actuator, and wherein the system includes multiple plasma actuators spaced apart from each other along the flow surface, the flow surface including no more than five rows of plasma actuators positioned forward of and generally transverse to the inlet aperture, with each row of actuators including at least two actuators arranged in a chevron shape.

24. The system of claim 18 wherein the controller is programmed with instructions to direct pulses having a pulse width of about 100 nanoseconds or less.

25. The system of claim 18 wherein the controller is programmed with instructions to direct pulses having a pulse width of from about two nanoseconds to about ten nanoseconds.

26. The system of claim 18 wherein the controller is programmed with instructions to direct pulses at a negative potential and apply a generally steady-state signal at a positive potential.

27. The system of claim 18 wherein the controller is programmed with instructions to direct pulses with an interpulse interval of from about one to about two microseconds.

28. The system of claim 18 wherein the air-ionizing pulses and the generally steady-state signal form portions of a first waveform, and wherein the controller is programmed with instructions to direct signals with a second waveform different than the first waveform to protect a surface at least proximate to the electrodes from ice formation.

29. The system of claim 18 wherein the controller is programmed with instructions to direct pulses having a voltage amplitude greater than a voltage amplitude of the generally steady-state signal.

30. The system of claim 18 wherein the first electrode includes at least one of a conductive and a semiconductive protective coating.

* * * * *